United States Patent [19]

Bleckmann et al.

[11] Patent Number: 4,546,437
[45] Date of Patent: Oct. 8, 1985

[54] METHOD AND CIRCUIT FOR THE CONTROL OF A BRAKE SLIP CONTROL APPARATUS

[75] Inventors: Hans-Wilhelm Bleckmann, Ober-Moerlen; Heinz Loreck; Helmut Fennel, both of Frankfurt am Main; Michael Zydeck, Glashuetten, all of Fed. Rep. of Germany

[73] Assignee: ITT Industries, Inc., New York, N.Y.

[21] Appl. No.: 508,374

[22] Filed: Jun. 27, 1983

[30] Foreign Application Priority Data

Sep. 18, 1982 [DE] Fed. Rep. of Germany ....... 3234637

[51] Int. Cl.[4] .............................................. B60T 8/00
[52] U.S. Cl. .................................... 364/426; 303/92; 303/95
[58] Field of Search .................... 364/426; 303/92, 95, 303/103

[56] References Cited
U.S. PATENT DOCUMENTS 4,113,321 9/1978 Bleckmann ........................... 303/92

*Primary Examiner*—William M. Shoop, Jr.
*Assistant Examiner*—Saul M. Bergmann
*Attorney, Agent, or Firm*—James B. Raden; William J. Michals

[57] ABSTRACT

To control a brake slip control apparatus, the rotational behavior of the wheels or of the axles is sensed with the aid of sensors, and the sensor signals for the generation of valve control signals, by which the braking pressure at the wheels is controlled dependent upon the wheel rotational behavior, will be processed electronically. On the basis of these sensor signals, valve control signals will be produced in at least two independently acting, synchronously driven logical circuit units, which may be integrated circuit configurations or complete "microcontrollers" or single-chip-microcomputers, and the signals' waveforms of each of the two circuit units can be compared and checked for agreement externally and internally at corresponding locations within the two circuit units. Upon the occurrence of variations in the external and/or the internal signals or in the signals' waveform, there will be caused, initiated or prepared a complete or partial disconnection of the brake slip control. A circuit configuration for implementing this method comprises a synchronizable astable multivibrator to process the sensor signals, a valve driver circuit including a level adjusting circuit as well as monitoring circuits for disconnecting the current supply for the regulator and for blocking the valve drivers in the event of interferences or variations in the signals' waveform occurring within the two circuit units. The monitoring circuits, one for each of the two circuit units, act on at least one transistor connected in series in the exciter circuit of a relay, by which the current supply is established or interrupted.

36 Claims, 9 Drawing Figures

METHOD AND CIRCUIT FOR THE CONTROL OF A BRAKE SLIP CONTROL APPARATUS

BACKGROUND OF THE INVENTION

The present invention relates to a method for the control of a brake slip control apparatus, in particular for automotive vehicles, wherein the rotational behavior of the wheels and/or of the axles is sensed with the aid of sensors and the sensor signals for the generation of valve control signals are processed electronically, these valve control signals serving to govern the braking pressure at the wheels dependent upon the wheel rotational behavior.

Methods and circuits of this type are basically subject to the requirement for high reliability of service and dependability. False reactions would in any case be very dangerous because the operation of brake slip control apparatuses is principally based on the temporary reduction of braking pressure to prevent a wheel lock, and thus, as it is meant to do, puts the brake unit at the individual vehicle wheels out of operation for a short time.

To prevent dangerous driving conditions and to reduce the risks imminent due to errors in the brake slip control apparatus, the brake slip control apparatus has to be disconnected upon the occurrence of interferences or defects, to the end that at least braking of the vehicle without slip control remains possible.

It is already known to additionally fit safety circuits and monitoring circuits into the control apparatus which upon interference will disconnect the entire anti-locking control system (German Patent DE-OS No. 2,340,575), or to integrate the safety circuits into the control circuits for the individual wheels (German Patent DE-AS No. 2,534,904) such that only the respective defect control circuit will be disconnected. By insertion of the monitoring circuit assigned to a wheel into the control circuit of another wheel, it is desired in the last-mentioned case (German Patent DE-AS No. 2,534,904) to reduce the number of electronic components required and to achieve furthermore that, even in the event of complete failure of a control circuit chip, the error will be indicated, namely, through the safety circuit in the intact control circuit chip.

It is furthermore known to insert into a brake slip regulator, which is equipped with at least one microcomputer for the slip control, another microcomputer for the checking and monitoring of the control channels, with the test computer including a device for the generation and the storage of test signals as well as a self-testing device. The test computer is connected to several warning devices and includes a control unit which after the start of braking interrupts the checking of the control signals and the activation of the self-testing device (German Patent DE-OS No. 2,928,981).

There is finally also known an electronic anti-locking regulator for automotive vehicles, wherein assigned to each controlled wheel is an individual channel with a calculating circuit and with a test circuit identical with the calculating circuit, and wherein the output signals of the calculating circuits and of the test circuits of different channels are in each case constantly compared in pairs with respect to equivalence or non-equivalence. The outputs of the comparators are in turn interconnected in a like manner until only two outputs having an equidirectional alternating signal are supplied to a last comparator, the output signal enables the recognition of an error in a calculating circuit or in a test circuit (German Patent DE-OS No. 2,612,356, U.S. Pat. No. 4,113,321).

SUMMARY OF THE INVENTION

It is an object of the present invention to provide a method for the control of a brake slip control apparatus which distinguishes over the known methods by an increased reliability of service and dependability and, in particular, by a swift perception of errors of different type within and outside the circuitry and a quick response thereto.

Another object of the present invention is to provide a circuit for carrying out the method of the present invention having comparatively little expenditure in circuitry and manufacture. A compact construction of the entire electronics and a maximum possible combination of the periphery circuit with the regulator is likewise a further object of the present invention.

A feature of the present invention is the provision of a method for the control of a brake slip control apparatus comprising the steps of generating a plurality of rotational behavior signals; producing a plurality of valve control signals in each of two logic circuits in response to the plurality of rotational behavior signals; comparing the plurality of valve control signals produced in the two logic circuits and signals at corresponding locations within the two logic circuits resulting in the plurality of valve control signals; and disabling at least partially the slip control apparatus when a difference between signals in the two logic circuits is detected in the comparing step.

A feature of the present invention is the provision of a circuit for the control of brake slip control apparatus comprising a plurality of sensors each associated with a different one of the wheels of an automotive vehicle to produce a rotational behavior signal; at least one converter coupled to the plurality of sensors to convert the plurality of rotational behavior signals to a plurality of binary signals each proportional to an associated one of the rotational behavior signals; at least two logic circuits each coupled to the converter to generate independent of each other a plurality of valve control signals in response to the plurality of binary signals, one of the two logic circuits generating the plurality of valve control signals to control the slip control apparatus; and a plurality of comparators equal in number to the at least two logic circuits, each of the plurality of comparators being coupled to the two logic circuits to compare internal signals of the two logic circuits at corresponding locations therein and to compare external signals including signals derived from the plurality of valve control signals and the plurality of valve control signals to disable the slip control apparatus when a difference between any one of the internal and external signals is detected.

Such circuit units may serve two or more "microcontrollers" operating pursuant to the same program, single-chip microcomputers or integrated logical circuits.

It is thus the basic idea of the present invention to redundantly process the signals in several—in general: two—complete circuit blocks or circuit units independent of one another and driven synchronously, so that at the ouputs of these blocks and at corresponding locations within the circuits like signals are present within predetermined time intervals. Since the sensor signals are supplied in parallel to the blocks, each error within the circuit blocks, including the circuits inserted into the signals' path, results in a different course, path or waveform of the signals, whereupon the assigned comparators respond immediately by a temporary standstill or a complete switch-off—independent of the error type and the implementation of the method or the circuit. Although both circuit units produce like valve control signals, a brake slip control action will be permitted or the switch-off or the standstill of the apparatus will be prevented only in the event of both circuit units being intact and producing in every instant internally as well as externally the same signals. By this, the required high reliability against malfunctioning will be accomplished.

In addition, according to other features of the present invention, external circuit errors, for instance, sensor errors, overvoltage or undervoltage, etc. will be recognized and will enable the disconnection of the brake slip control apparatus together with the signalling of errors.

In an advantageous embodiment of the inventive method, the sensor signals will be prepared before they are supplied to the logical circuit units, for which purpose a self-oscillating synchronizable trigger circuit is used for each sensor. This serves to simultaneously monitor the sensors and the sensor feed line for short circuit and line interruption because in case of error, the self-oscillation of the trigger circuit is discontinued, which will in turn be recognized by the subsequent "microcontroller" and cause switch-off of the apparatus.

If, according to another embodiment of the present invention, the valve control signals at the output of a logical circuit unit are fed back after amplification and level adjustment, as switching signals to one or the other or both logical circuit units and are compared with the valve control signals of these circuit units, these stages disposed on the signals' path will also be included in the test circuit.

Furthermore, according to this invention, the prepared sensor signals can be processed in a separate step or preferably within the logical circuit units. This necessitates special effort since the quick making available and evaluation of variations in speed or acceleration of the individual wheels causes difficulties. When employing "microcontrollers" as logical circuit units, first numerical values have to be produced which are proportional to the measured-pulse trains supplied by the sensors. In an alternative embodiment of the present invention, the processing of the sensor signals is effected in a "microcontroller": by two of the four wheel sensors. This reduces the effort needed without disadvantages being incurred thereby.

According to still another embodiment of this invention, there is assigned to each logical circuit unit a monitoring circuit which, dependent upon several criteria, maintains the current supply of the regulator or switches it off, respectively. For example, the monitoring circuit checks a pulse train for constant frequency and constant pulse-pause ratio, the desired pulse train being supplied by a circuit unit operating properly, and causes the switch-off in the event of variations in the frequency or in the pulse width. When the battery voltage exceeds a predetermined threshold value, the regulator will likewise be switched off.

Finally, it is provided according to the invention to have a condenser arranged in the monitoring circuit with a view to monitoring the operating clock of the two logical circuit units, the condenser being charged with stable current and discharged dependent upon clock pulse train. To this end, the condenser voltage will be compared with three predefined voltage threshold values. If the medium threshold value is not attained or if the upper threshold value is exceeded, this will result in the regulator being switched off. The lower voltage threshold value resets a flip flop within the monitoring circuit and, thus, stops the discharging of the condenser.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
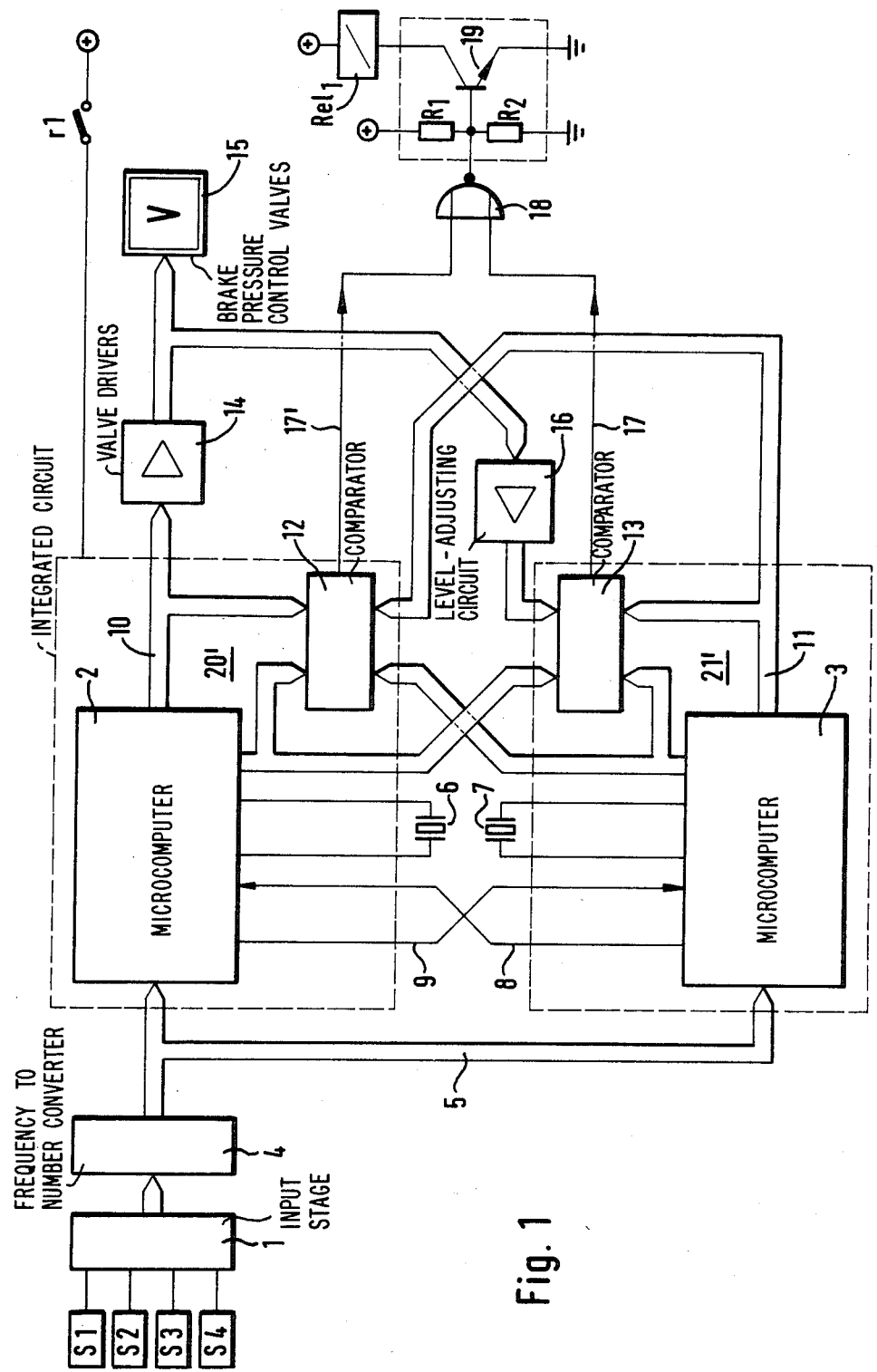
FIG. 1 is a block diagram of a first embodiment of the control circuit in accordance with the principles of the present invention.

In the embodiment of the invention shown in FIG. 1, each vehicle wheel is provided with a sensor $S_1$ to $S_4$. These sensors are inductive pulse generators whose output signals are prepared in the input stage 1, which includes among other things a Schmitt-trigger for each sensor, so that there is provided a pulse train dependent upon the wheel rotational behavior.

The most significant components of the circuit according to FIG. 1 are the two logical circuit units 2 and 3 to which the sensor signals are supplied in parallel via a bundle line. The units or blocks 2 and 3 symbolize in this arrangement identical single-chip microcomputers operating pursuant to the same program which are termed "microcontrollers" according to their operation. Prior to their coupling to microcomputers 2 and 3, the prepared sensor signals are first converted in the circuit (an analog to digital converter) into digital numerical values which are proportional to the frequency of the sensor or measured-pulse trains, the latter having been provided by the individual sensors $S_1$ to $S_4$ and prepared in the stage 1.

The two microcomputers or "microcontrollers" 2 and 3 have clock generators 6 and 7, respectively, of their own. Two crossing signal lines 8 and 9 serve for the permanent mutual synchronization of the two blocks 2 and 3. The valve control signals at the output of the circuit units 2 and 3, which signals are produced as a result of the signal processing, are supplied via bundle lines 10 and 11 to their own comparator 12 or 13, respectively, on the one hand, and to the comparator 13 or 12, respectively, assigned to the other circuit unit, on the other hand. To include into the test circuit the valve drivers 14 which are actuated by the circuit unit 2 and provide the brake pressure control valves 15 with the switching energy required, in the embodiment according to FIG. 1, the valve control signals of unit 2 are, prior to being compared to the output signals of unit 3, fed back via valve drivers 14 and via a level adjusting circuit 16 to comparator 13, the level adjusting circuit 16 comprising in this arrangement also a commutable comparator circuit. There is no need for the valve control signals produced in the second circuit unit 3 to make such a detour, because they are generated for testing purposes only, not for the actual brake pressure control.

Furthermore, it can be taken from the circuit of FIG. 1 that there are supplied for comparison to comparators 12 and 13 not only the output signals or valve control signals, respectively, but also internal signals which represent, for instance, the vehicle reference speed, the wheel speed, wheel acceleration, etc. As soon as any one of the two comparators 12 and 13 detects variations, a transistor 19 will be shut off via the associated signal lines 17 or 17' and the NOR-gate 18. As a result thereof the relay $Rel_1$ will be deactivated and the current supply for the entire regulator will be disconnected via the contact $r_1$, as is illustrated symbolically in FIG. 1.

When manufacturing the circuit, suitably the circuit units 2 and 3 and comparators 12 and 13, respectively, are each united in different integrated logical circuit unit 20' and 21' indicated in FIG. 1 by the dotted block.

Figure 2:
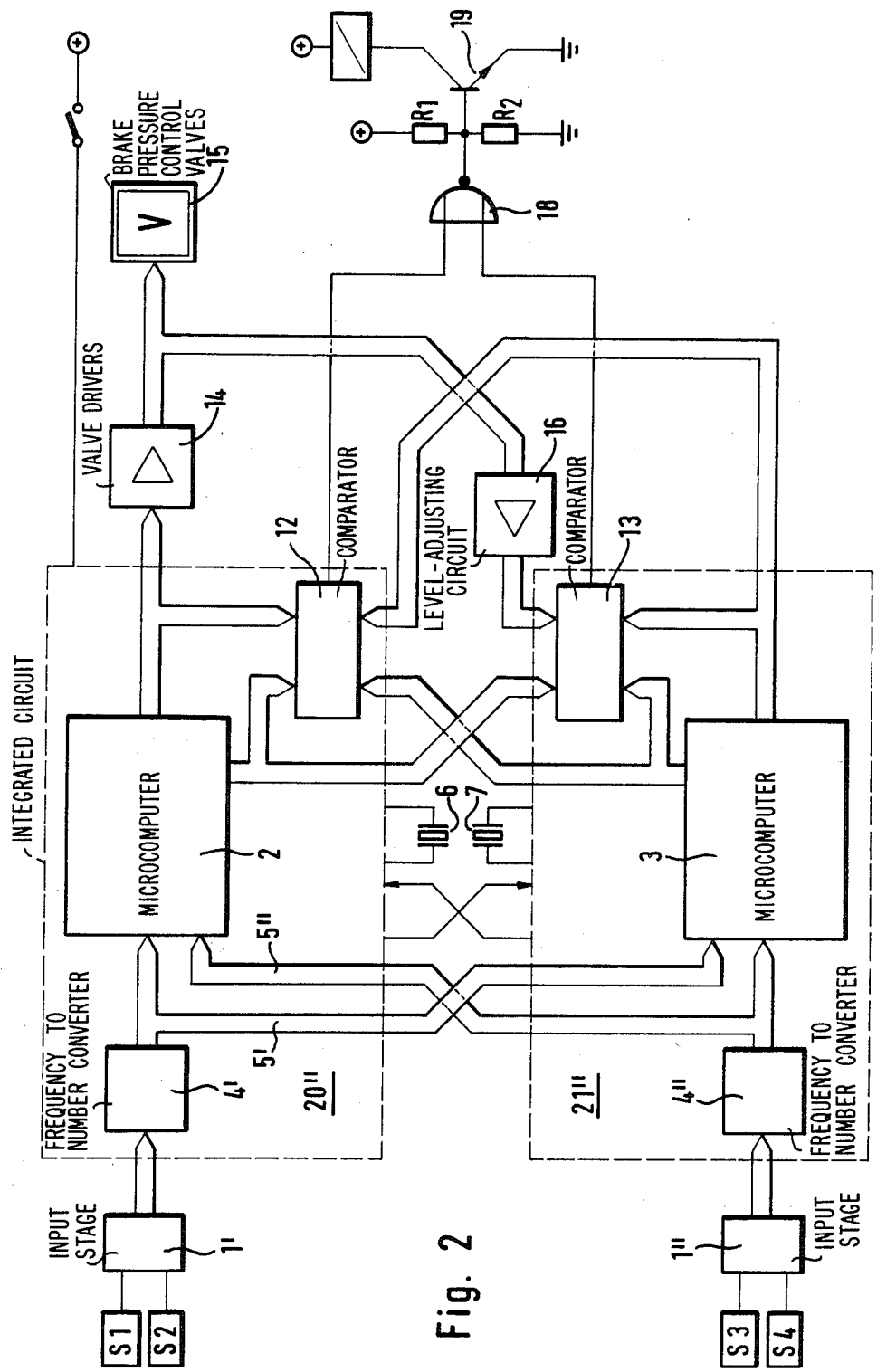
FIG. 2 is a block diagram of a second embodiment of the control circuit in accordance with the principles of the present invention.

The embodiment of FIG. 2 differs from the circuit of FIG. 1 basically only in that the processing of the prepared sensor signals in the circuits 4' and 4", i.e. the generation of trains of signal values or numerical values to be further processed in the logic units 2 and 3, are included in the integrated circuits 20" and 21". In this arrangement, it has proved favorable with respect to circuitry to accommodate the signal processing of the signal preparation for the two sensors $S_1$ and $S_2$ by circuit 4' in integrated circuit 20" and for the two sensors $S_3$ and $S_4$ by circuit 4" in integrated circuit 21". Since the results of the signal processing in the two circuits 4' and 4" are required for further processing in both logic circuits 2 and 3, additional bundle lines 5', 5" will be needed in this case, through which lines the results of the processing in the circuits 4' and 4" are introduced in parallel into both logic circuit 2 and 3.

Figure 3:
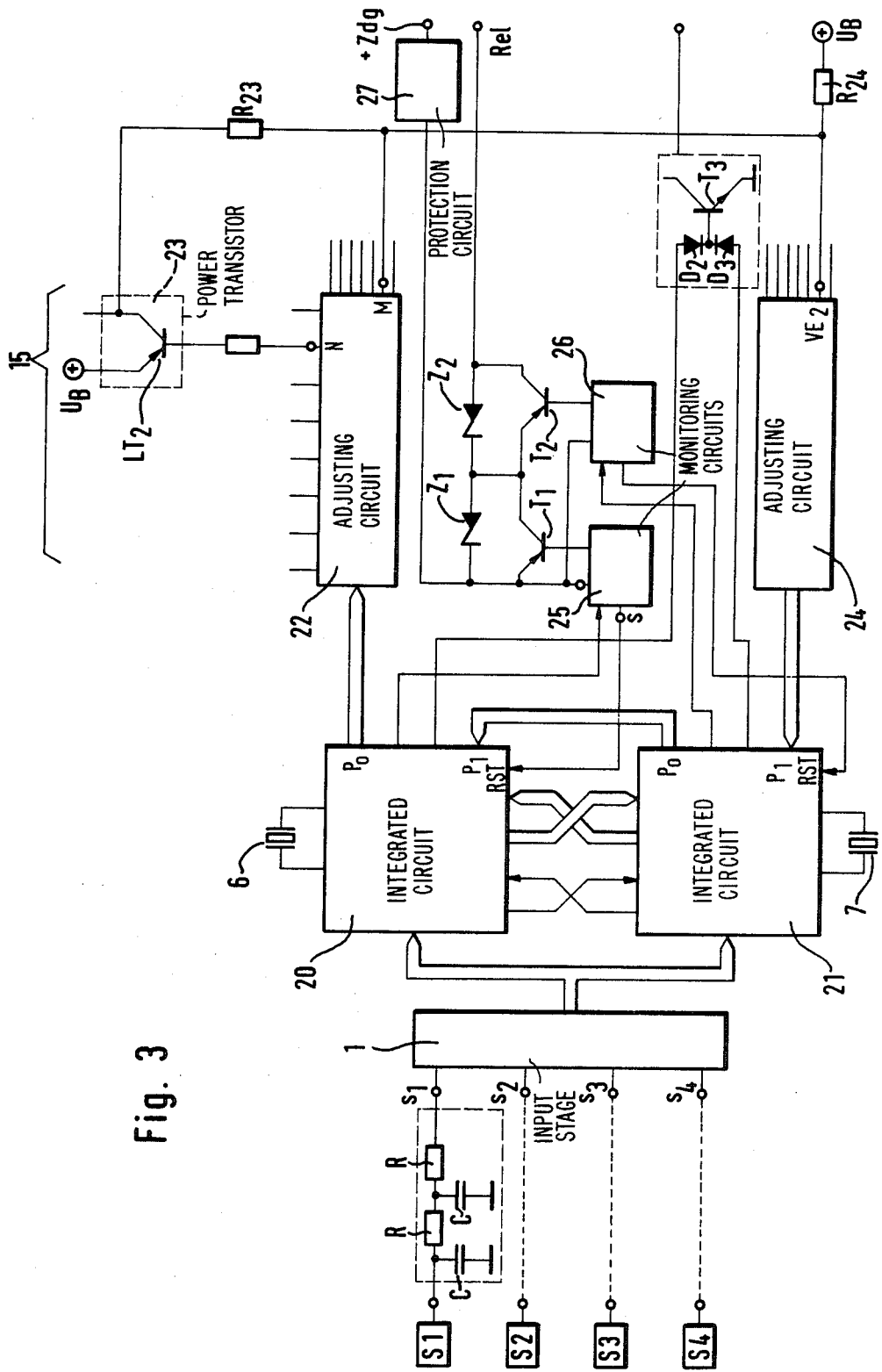
FIG. 3 is a block diagram of a modification of the embodiment of FIGS. 1 or 2 divided into integrated circuits.

The two integrated circuits 20 and 21 in FIG. 3 correspond to the integrated circuits 20" and 21" in FIG. 2 or to the integrated circuits 20' and 21' in FIG. 1 including the circuit 4.

Each of sensors $S_1$-$S_4$ are connected via a RC-network to input stage 1, which—for the sake of clarity—is shown in FIG. 3 for sensor $S_1$ only. These RC-networks form a low-pass filter to filter high-frequency interfering signals.

The valve control signals generated in the "microcontroller" of integrated circuit 20 are passed on via the output $P_O$ to the valve drivers 14 (see FIG. 1 and FIG. 2) which includes in this arrangement of one adjusting circuit 22 and of one power transistor 23 for each individual (not shown here) electromagnetically actuated pressure control valve. All of these valves are symbolized by reference numeral 15 in FIGS. 1 and 2. To control the braking pressure fluid in a brake system in which all wheels are controllable individually, there are required, for instance, for each wheel one inlet and one outlet valve and, in addition, one or several main valves for governing the introduction of pressurized fluid into the total circuitry. In the present case, there is provided the connection of three pressure-increasing valves, three pressure-reducing valves and one main valve.

In FIG. 3, there is shown only one of all the parallel power transistors LT, namely power transistor $LT_2$, while for the other stages only the connections are indicated. The feedback from the collector of the transistor 23 via the resistor R23 to the connection M of adjusting circuit 22 is required, as will be described in detail hereinbelow by way of FIG. 5, to limit the overvoltage when disconnecting the inductive load connected to the collector of the transistor 23, namely, the magnet winding of the pressure control valve. For the feedback of the switching signal, which is proportional to the output signal of the "microcontroller" of circuit 20, from the transistor 23 to the output of the "microcontroller" of integrated circuit 21, a level adjustment is necessary which takes place in adjusting circuit 24.

To monitor the proper operation of the microcomputer or "microcontroller" to generate a START-signal after switching on of the apparatus, as well as to switch off the regulator according to specific criteria, the two monitoring circuits 25 and 26 are provided. Only in the event of proper operation will the two transistors $T_1$ and $T_2$ that are connected in series be saturated and, thus, cause activation of the relay coupled at the junction point Rel., the relay switching on and maintaining the current supply for the regulator analogous to the relay $Rel_1$ in FIG. 1. The Zener diodes Z1 and Z2 serve to limit the inductive disconnecting voltage.

The switching-on of the monitoring circuits 25, 26, the switching-on of the relay Rel. and the release of the START signal (restart or reset signal) will be effected in the present case after switching on the ignition via the connection Zdg. As protection against overvoltages and for the current limitation, a protection circuit 27 is inserted into the supply lines to the circuits 25 and 26.

Finally, there is illustrated in FIG. 3 a switching transistor $T_3$ which serves as a warning lamp driver and responds to error signals, the error signals being generated by the "microcontrollers" of integrated circuits 20 or 21 and being supplied to the anode of diode D2 or D3.

Figure 4:
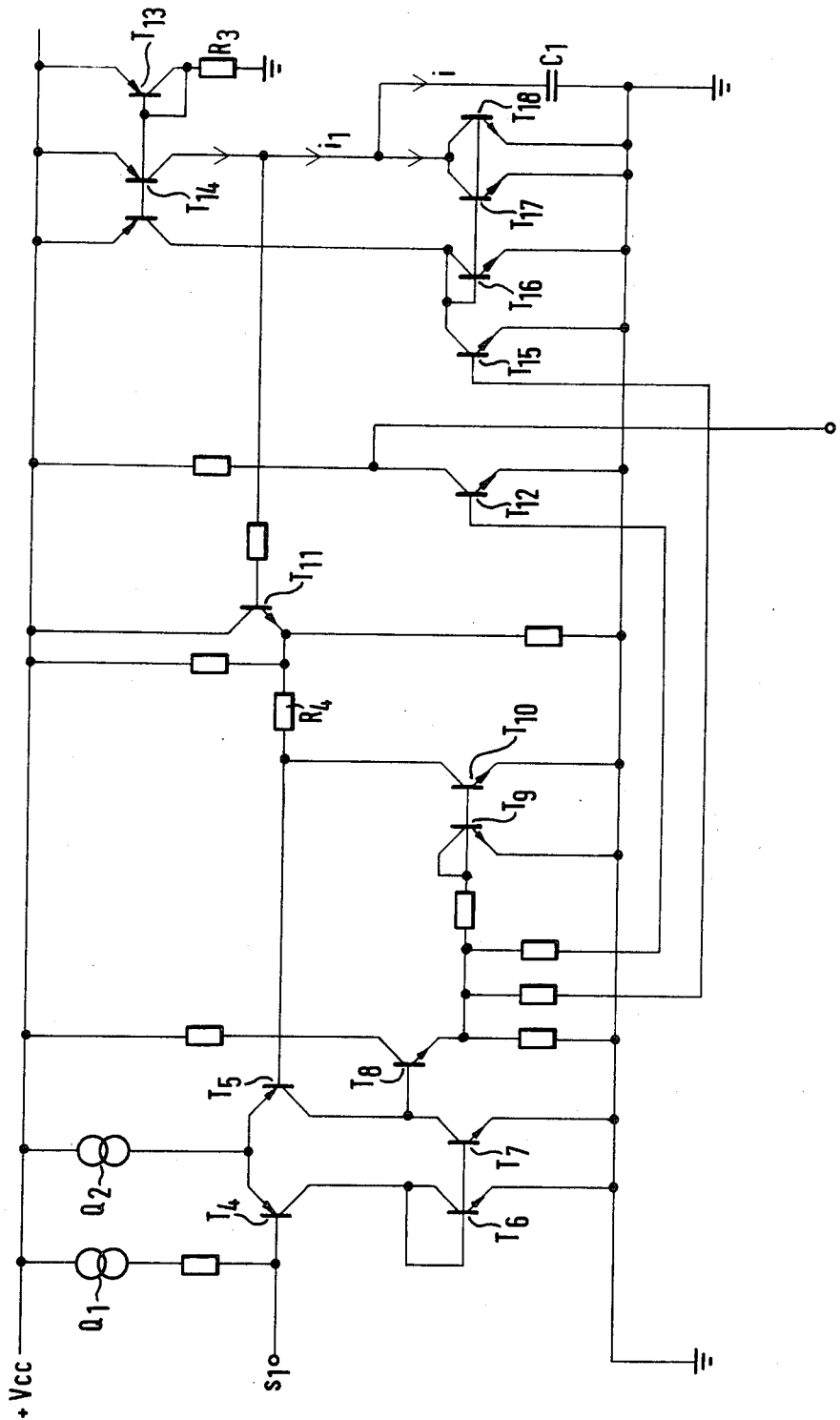
FIG. 4 is a schematic diagram of a circuit for preparing sensor signals for the embodiment of FIGS. 1 or 2.

FIG. 4 shows an embodiment of the signal preparing stage 1 for the pulse train delivered by each of the individual sensors $S_1$ to $S_4$. Stage 1 includes of each pulse train of sensors $S_1$ to $S_4$ a synchronizable astable multivibrator, or a Schmitt-trigger, which became self-oscillating by a RC-feedback. After having passed a low-pass filter, see FIG. 3, the signal generated by the sensor $S_1$ will be present at the input s1 of a difference amplifier T4, T5, whose operating point is adjusted via the stable current sources $Q_1$ and $Q_2$. The circuit consists of a simple differential amplifier (Q2; T4-8) with a positive feedback - loop (T10; R4) to implement 1. Hysteresis; 2. Negative feedback with time delay caused by an integrator circuit T13-18 and T11 in connection with an integrating capacitor C1; 3. Output switching stage consisting of T12 and the corresponding resistor; 4. Input offset current source Q1 generating a DC offset voltage across the connected wheel sensor resistance. When a sensor is connected between ground and input S1 of the circuit and +Vcc being switched on, this current source Q1 will deliver a current into the sensor via S1 and the voltage at S1 will become about Vcc/2. Initially the voltage over C1 is zero the base voltage of T4 is higher than the one of T5. Now T5 is conducting and so is T8. They deliver base current for output transistor T12 for the hysteresis circuit T9, T10 and for transistor T15 of the integrator circuit. T13 and T14 are charging C1, acting as a constant current source, delivering current i1. The discharge current source (T16-T18) is disabled by T15. The voltage over C1 will so increase. This voltage is boosted by the emitter follower T11 and a hysteresis voltage is substracted from the output voltage of the emitter follower being the voltage drop of T10 collector current through R4. This combined voltage is supplied into the base of T5, increasing due to C1 capacitor voltage until it exceeds the input voltage at S1. Then T5 and T8 switch off. So do the hysteresis current source, T9, T10, T15 and the output transistor T12. The voltage at the base of T5 steps up due to the loss of the voltage over R4 (no current through T10). With T15 switched off, T17 and T18 will act as a current source and will drain a current of 2xi1 discharging capacitor C1 with a current of -i1. The voltage will decrease until the base voltage of T5 reaches the base voltage of T4. Now T5 and T8 are switched on again, hysteresis voltage drop establishes on R4 and the first cycle of the self oscillation has finished. Whenever the sensor produces an AC signal with a higher frequency than the self oscillation frequency and large enough to exceed the hysteresis, the circuit acts as a Schmitt trigger for the sensor signal. Whenever, the input S1 is open circuit or shorted to ground the effective voltage at S1 is out of that range, that the base voltage of T5 can follow the integrating feedback loop is interrupted and the output transistor will deliver a steady low or high level signal to the connected microprocessors. By software means a too long input pulse period is detected and evaluated as failure condition.

By these simple arrangements, employing a trigger with self-oscillation, the sensor connection will be monitored permanently for interruption or short circuit.

The circuit 1 as well as the circuits 22, 24, 25 and 26 are integrated switching circuits. Integrated circuits 20 and 21 in their capacity as microcomputers or "microcontrollers" are realizable only in large scale integration (LSI) technology.

Figure 5:
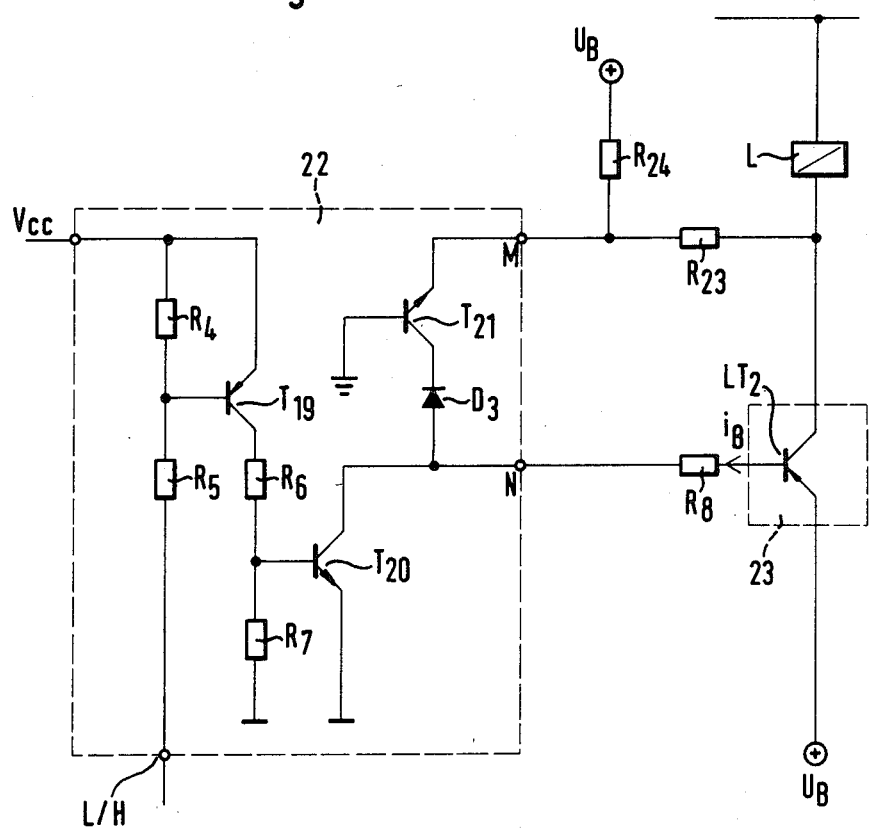
FIG. 5 is a schematic diagram of the valve-driver circuit for the modification of FIG. 3.

FIG. 5 shows part of the adjusting circuit 22 (FIG. 3)—simplified and only the circuit configuration required for the power transistor $LT_2$. $V_{CC}$ designates the supply voltage for the integrated switching circuit 22. The signal input is symbolized by L/H (Low/High). The input signal at the input L/H is transmitted via the voltage divider $R_4$, $R_5$ onto the transistor $T_{19}$, via $R_6$ and $R_7$ onto transistor $T_{20}$ and onto the output N. When the transistor $T_{20}$ is saturated, the power transistor $LT_2$ and, thus, the coil L, which symbolizes the exciter circuit of an electromagnetic braking pressure control valve, will be switched on.

The transistor $T_{21}$ within adjusting circuit 22 which is shut off first due to the voltage divider $R_{24}$ and $R_{23}$ will begin to operate upon switching off of the transistor $LT_2$. This is because the energy stored in coil L causes modulation of the transistor $T_{21}$ as soon as the switching-off action of $LT_2$ commences, which modulation in turn causes via resistor $R_8$, via the guard diode D3 and via transistor $T_{21}$ a base current $i_B$ saturating the transistor $T_{21}$, and, thus, keeps the power transistor $LT_2$ conductive until the stored energy has been removed.

The comparator and level adjusting circuit 24 contains for each pressure control valve and for each power transistor LT—the number of valves required depends, as has been explained previously, on the individual construction of the brake slip control apparatus—one comparator and difference amplifier as well as a common reference level circuit. The basic intercoupling can be seen from FIG. 6. The level circuit has been assigned reference numeral 28 and the individual difference amplifiers $29$-$V_I$ to $29$-$V_n$. The signal feedback takes place via the line H/L, the reference point REF is connected to the grounded valve housing. TH symbolizes the threshold value generated by the level circuit 28. At the input of the difference amplifiers, the exciter coils of the valves and the collectors of the power transistors LT are connected via the connections $VE_I$ through $VE_n$. The corresponding outputs of the difference amplifiers $V_I$ through $V_n$ lead back to the microcomputer of intergrated circuit 21.

Figure 6:
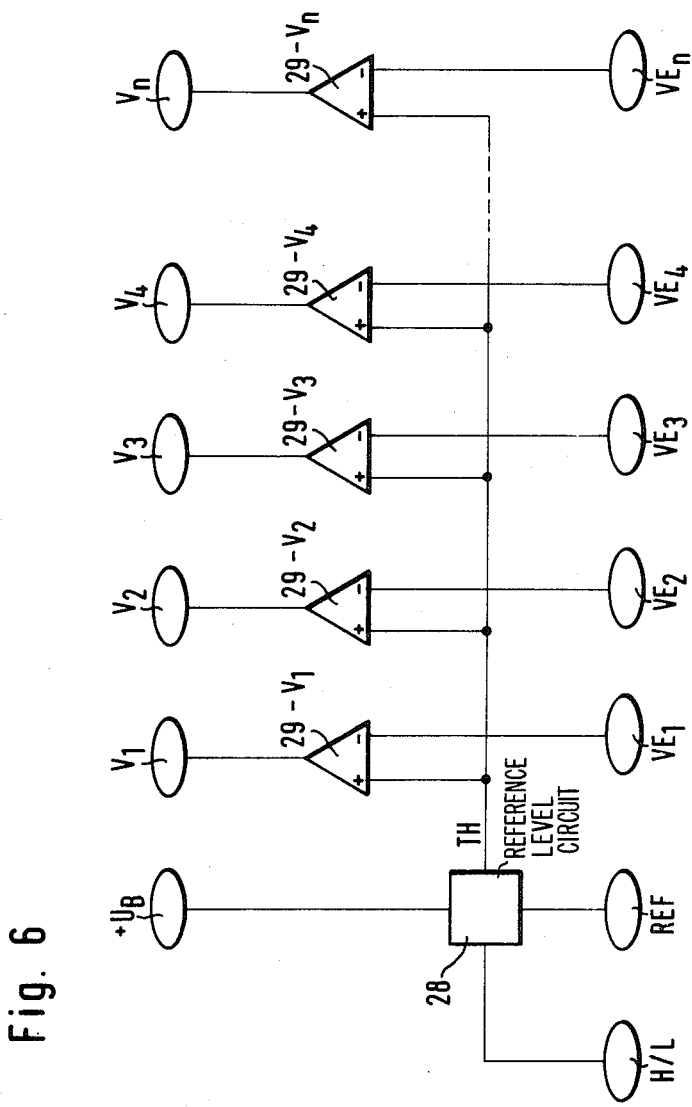
FIG. 6 is a block diagram of a commutable comparator circuit with level adjustment for the modification of FIG. 3.
Figure 7:
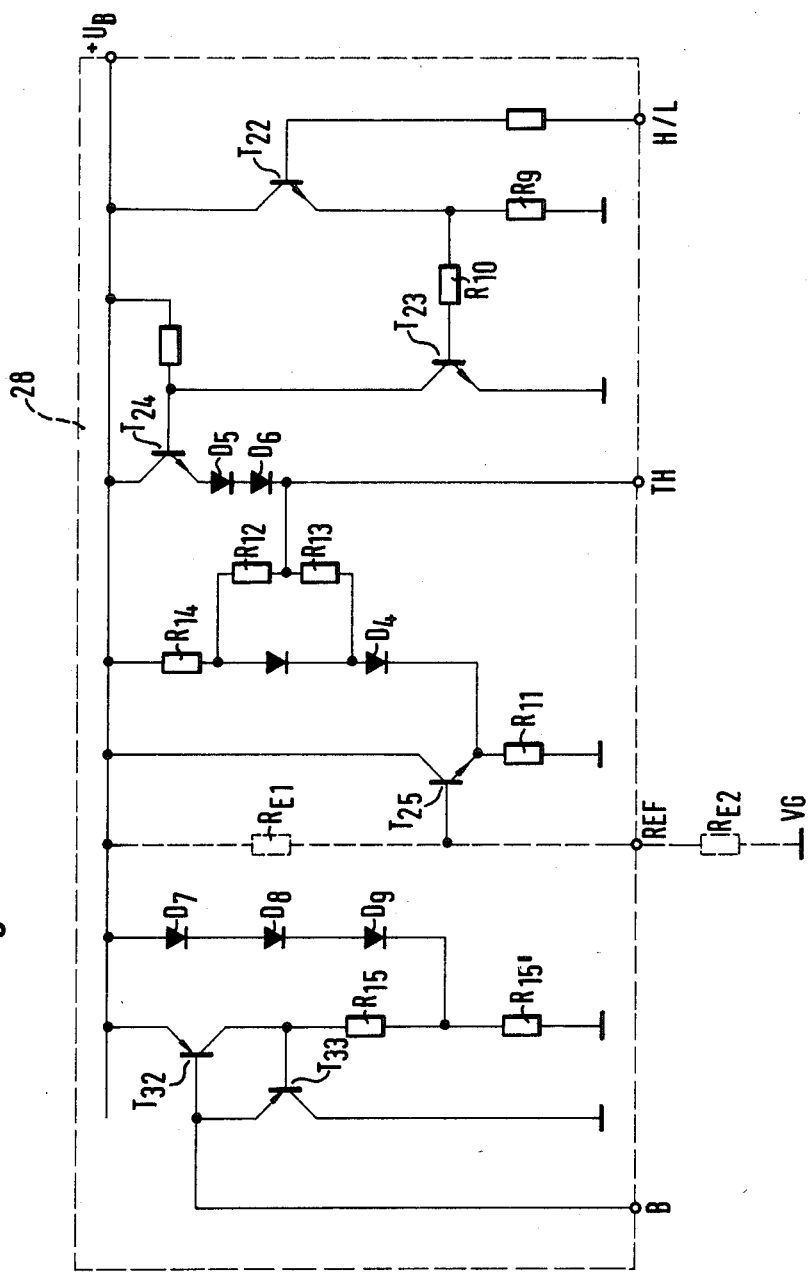
FIG. 7 is a schematic diagram of the reference level circuit of FIG. 6.

According to FIG. 7, reference level circuit 28 of FIG. 6 includes at the signal input H/L a transistor $T_{22}$ which, in the event of the input level being high, will switch via the resistor $R_{10}$ the transistor $T_{23}$ to be conductive and will thus shut off the subsequent transistor $T_{24}$. The reference threshold TH is now disposed almost at the potential of the input REF, via the transistor $T_{25}$ connected as an emitter follower and via the diode D4. If, on the contrary, the voltage at the input H/L becomes low (L), transistors $T_{22}$ and $T_{23}$ will be shut off so that the voltage at the reference point TH has now assumed almost the level of the supply voltage $U_B$, only reduced by the collector-emitter voltage of the saturated transistor $T_{24}$ and by the forward voltage of the two diodes D5 and D6. The connection REF leads to an external voltage divider with the resistors $R_{E1}$ and $R_{E2}$, drawn in dotted lines, and is via resistor $R_{E2}$ connected to the grounded valve housing VG.

Figure 8:
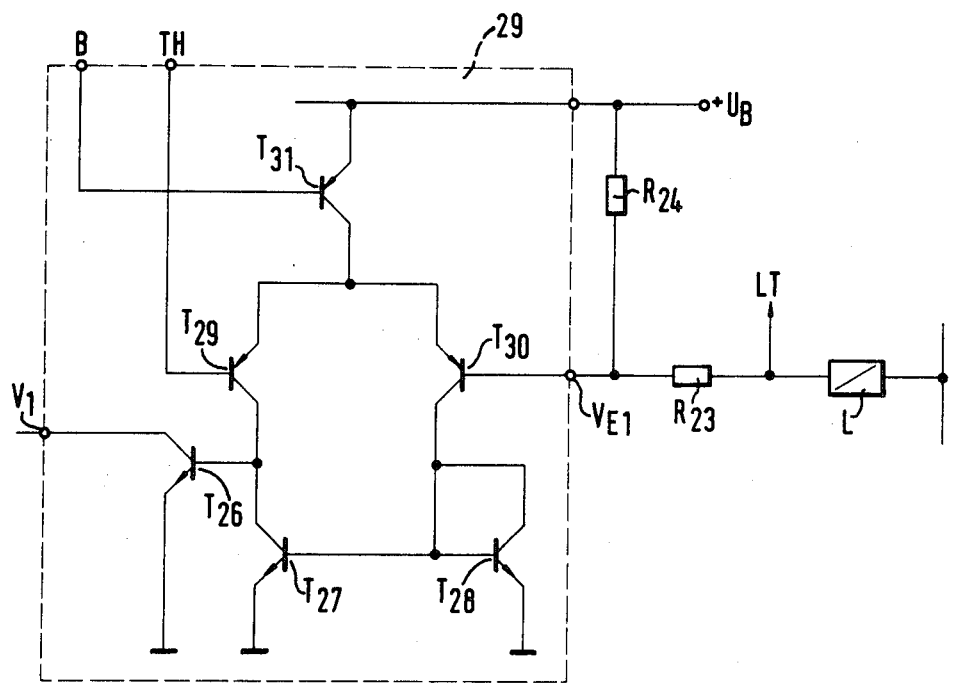
FIG. 8 is a schematic diagram of the comparator circuit of FIG. 6.

In contrast to the circuit of FIG. 7 which exists only once, the circuit of FIG. 8 is required for each of the comparator circuits 29 for the feedback of the switching signal from each valve. The voltage at the individual valves is monitored by the difference amplifiers and the comparator stages 29, each of which include the transistors $T_{26}$ and $T_{31}$. To this end, the voltage at the base of the transistor $T_{29}$ is compared to the voltage at the base of transistor $T_{30}$ which voltage is determined by the voltage divider $R_{24}$ and $R_{23}$ (see FIG. 3) and by the switching position of the associated power transistor LT or of the solenoid valve controlled by the power transistor. With the base voltage at transistor $T_{30}$ falling below the value of the reference voltage TH, the collector current of transistor $T_{31}$ is supplied via transistor $T_{30}$ to transistors $T_{27}$ and $T_{28}$. The output transistor $T_{26}$ will be shut off thereby so that the voltage at output $V_1$ (see FIG. 6) can be increased by an external resistor.

If, on the other hand, the valve driver voltage at the input $VE_1$ and at the connected base of the transistor $T_{30}$ exceeds the reference value TH, the collector current of transistor $T_{31}$ is supplied via transistor $T_{29}$ to the base of transistor $T_{26}$, whereby transistor $T_{26}$ will be connected through and the output level $V_1$ will be grounded. The part of the circuit illustrated in FIG. 7, which comprises substantially transistors $T_{32}$ and $T_{33}$, diodes D7 to D9 as well as the voltage divider resistors $R_{15}$ and $R_{15'}$, represents in connection with the transistor $T_{31}$ a current mirror circuitry and serves as a stable current source for the comparator stages formed by the transistor pair $T_{29}$ and $T_{30}$.

Figure 9:
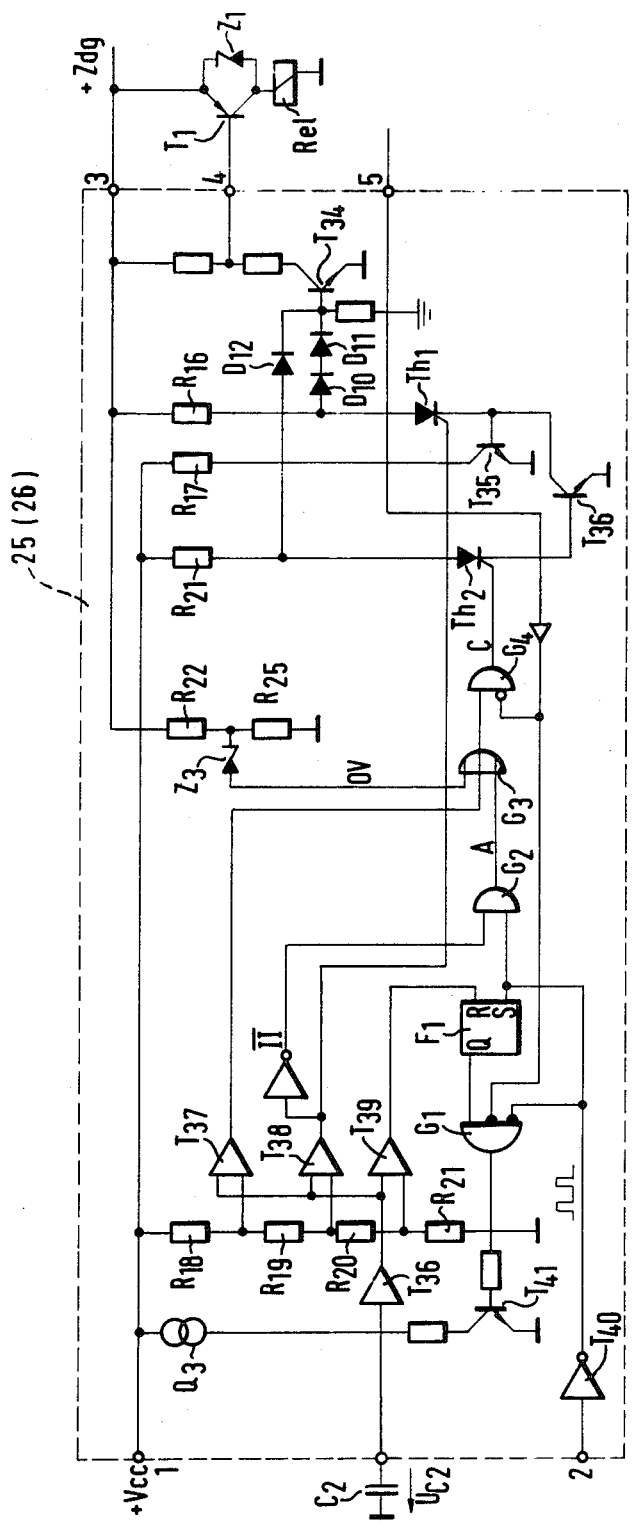
FIG. 9 is a block diagram of the monitoring circuit of FIG. 3.

The principal mode of operation of the monitoring circuit 25 (see FIG. 3) can be described with respect to FIG. 9.

The second monitoring circuit 26 is of identical construction as monitoring circuit 25. As has been explained before, two amplifier stages $T_1$, $T_2$ are connected in series so that the relay Rel—in contrast to the illustration in FIG. 9—is able to respond only in the event of both transistors $T_1$, $T_2$ being saturated.

After switching on the ignition Zgd, positive voltage will be applied to the input 3. As a result thereof the transistor $T_{34}$ will be switched on via the resistor $R_{16}$ and via the diodes D10, D11. The transistor $T_1$ connected to the output 4 activates the relay Rel.

By means of a relay contact, not shown, next the supply voltage $V_{CC}$ for the circuitry shown will be switched on. This voltage is likewise positive. Since first the thyristor $Th_1$ and, thus, also the transistor $T_{35}$ are shut off, the switched-on voltage $V_{CC}$ causes via $R_{17}$ a reset signal or START signal which is supplied through the output 5 to the associated microcomputer of integrated circuit 20.

Applied to signal input 2 is now a pulse train corresponding to the operating cycle of the microcomputer 20 having a constant pulse frequency which causes a periodic charging and discharging of the capacitor $C_2$.

The capacitor $C_2$ is first charged via the current source Q3. The charging voltage $U_{c2}$ is tapped by the impedance converter $T_{36}$ and compared with three different voltage thresholds by means of the voltage comparators $T_{37}$, $T_{38}$ and $T_{39}$. The comparison voltages are derived from the supply voltage $V_{CC}$ via the voltage divider $R_{18}$, $R_{19}$, $R_{20}$ and $R_{21}$. As soon as the voltage has reached the threshold value at the comparator $T_{38}$, the thyristor $Th_1$ will be switched on, the base current flowing via the diodes D10, D11 being interrupted as a result. However, the transistor $T_{34}$ continues to be conductive because it is retained in its on-state via the resistor R21 and the diode D12.

The signal at the input 2 which monitors the operating cycle of the microcomputer of integrated circuit 20 is a logical high first and will be interrupted by pulses of specific period. After inversion of the pulse, the flip flop F1 is set. The output of the flip flop F1 is via the AND-gate G1 connected to the transistor $T_{41}$ which discharges the capacitor $C_2$ when switched on by a positive ramp of a pulse shaped signal received at input 2.

Since the capacitor $C_2$ is charged with constant current and periodically discharged there results a sawtooth voltage $U_{c2}$ whose amplitude depends on the duration of charging and discharging.

When the flip flop F1 is set and the signal at the input 2 is high (H) again, the capacitor $C_2$ will be discharged until the lowest threshold value is reached which depends on the comparator $T_{39}$ and the flip flop F1 is reset. The capacitor voltage $U_{c2}$ will now rise again linearly.

The relay Rel will be switch off by switching on of the thyristor $TH_2$ under the following failure modes:
(a) If the pulse period between two succeeding logical low input pulses is too short, the medium voltage threshold value on which the comparator $T_{38}$ is set will not be reached. The logical AND of signal T end output $T_{40}$ will switch on the thyristor $TH_2$ via G3 and G4. As a result the current flow via diode D12 will be interrupted, transistor $T_{34}$ and external transistor $T_1$ will be shut off and, thus, the relay is switched off.
(b) If, in an other case, the pulse period is too long, the capacitor voltage $U_{c2}$ exceeds the upper threshold value so that comparator $T_{37}$ will respond. As a result, again thyristor $TH_2$ will be switched on and the relay will, thus, be deactivated.
(c) If a too high voltage prevails at the input 3, the thyristor $TH_2$ will be ignited via the voltage divider $R_{22}$, $R_{25}$ because the voltage of the Zener diode $Z_3$ will be exceeded in this case and the latter will be rendered conductive thereby.

By switching on the thyristor $TH_2$, the transistor $T_{36}$ will be saturated and transistor $T_{35}$ shut off. By this, a reset signal will be supplied via the output 5 to the "microcontroller" integrated circuits 20 and 21 and the regulator and the valve drivers will be shut off this way. In case the relay Rel sticks, for instance, or is not deactivated in time for other reasons, it will be ensured nevertheless that the antiskid or slip control is put out of operation.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit for the control of brake slip control apparatus comprising:
    a plurality of sensors each associated with a different one of the wheels of an automotive vehicle to produce a rotational behavior signal;
    at least one converter coupled to said plurality of sensors to convert said plurality of rotational behavior signals to a plurality of binary signals each proportional to an associated one of said rotational behavior signals;
    at least two synchronized logic circuits each coupled to said converter to generate independent of each other a plurality of valve control signals in response to said plurality of binary signals, one of said two logic circuits generating said plurality of valve control signals to control said slip control apparatus; and
    a plurality of comparators equal in number to said at least two logic circuits, each of said plurality of comparators being coupled to said two logic circuits to compare internal signals of said two synchronized logic circuits at corresponding locations therein and to compare external signals including signals derived from said plurality of valve control signals and said plurality of valve control signals to disable said slip control apparatus when a difference between any one of said internal and external signals is detected.

2. A circuit according to claim 1, wherein said plurality of comparators switch off a current supply to said slip control apparatus by means of a relay upon detection of said difference.

3. A circuit according to claim 2, wherein said current supply is switched off as long as said difference is present.

4. A circuit according to claim 1, wherein said plurality of comparators switch off a current supply to said one of said two logic circuits by means of a relay upon detection of said difference.

5. A circuit according to claim 4, wherein said current supply is switched off as long as said difference is present.

6. A circuit according to claim 1, wherein each of said two logic circuits is a microcontroller operating according to a given program.

7. A circuit according to claim 1, wherein each of said two logic circuits is a single-chip microcomputer operating according to a given program.

8. A circuit according to claim 1, wherein each of said two logic circuits is contained in a different one of two integrated circuits along with its associated one of said plurality of comparators.

9. A circuit according to claim 8, wherein said converter is contained in at least one of said two integrated circuits.

10. A circuit according to claim 9, wherein there are two of said converters each coupled to different ones of said plurality of sensors, and each of said two integrated circuits includes one of said converters.

11. A circuit according to claim 1, further including valve drivers for said slip control apparatus coupled to the output of one of said two logic circuits to provide valve switching signals for said slip control apparatus; and a level-adjusting circuit coupled between the output of said valve drivers and inputs of that one of said plurality of comparators associated with the other of said two logic circuits.

12. A circuit according to claim 11, wherein each of said two logic circuits have their own external clock generator, and each of said two logic circuits are synchronized to one another.

13. A circuit according to claim 12, further including an input stage coupled between said plurality of sensors and said converter, said input stage having a plurality of synchronizable astable multivibrators each coupled to a different one of said plurality of sensors, each of said plurality of multivibrators having a self-oscillation at an inherently low frequency when said vehicle is at a standstill and the associated one of said plurality of sensors is turned on, said self-oscillation being discontinued when a malfunction occurs in said associated one of said plurality of sensors.

14. A circuit according to claim 13, further including a plurality of monitoring circuits each coupled to a different one of said two logic circuits, each of said plurality of monitoring circuits maintain a current supply coupled to said two logic circuits in the case of error-free operation and disconnects said current supply from said two logic circuits when said difference is detected by at least one of said plurality of comparators.

15. A circuit according to claim 14, wherein said current supply is coupled to said two logic circuits by at least one relay controlled by electronic switching elements, said switching elements being connected in series and actuatable by output signals of said plurality of monitoring circuits.

16. A circuit according to claim 15, wherein said plurality of monitoring circuits switch on said current supply dependent upon battery voltage of said vehicle and switch off said current supply when said battery voltage exceeds a predetermined threshold value.

17. A circuit according to claim 16, wherein said plurality of monitoring circuits each provide a start signal to its associated one of said two logic circuits after said current supply has been switched on.

18. A circuit according to claim 17, wherein each of said monitoring circuits include
a condenser charged by a stable current and discharged pursuant to said clock of an associated one of said two logic circuits,
three comparators coupled to said condenser to compare the voltage of said condenser with three different threshold values,
a flip flop coupled to one of said three comparators, said flip flop being reset to terminate discharging of said condenser when a lower of said three threshold values is attained, and
circuit means coupled to said others of said three comparators responsive to exceeding an upper one of said three threshold values and not attaining a medium one of said three threshold values to disable said slip control apparatus.

19. A circuit according to claim 1, wherein each of said two logic circuits have their own external clock generator, and each of said two logic circuits are synchronized to one another.

20. A circuit according to claim 19, further including an input stage coupled between said plurality of sensors and said converter, said input stage having a plurality of synchronizable astable multivibrators each coupled to a different one of said plurality of sensors, each of said plurality of multivibrators having a self-oscillation at an inherently low frequency when said vehicle is at a standstill and the associated one of said plurality of sensors is turned on, said self-oscillation being discontinued when a malfunction occurs in said associated one of said plurality of sensors.

21. A circuit according to claim 20, further including a plurality of monitoring circuits each coupled to a different one of said two logic circuits, each of said plurality of monitoring circuits maintain a current supply coupled to said two logic circuits in the case of error-free operation and disconnects said difference is from said two logic circuits when said difference is detected by at least one of said plurality of comparators.

22. A circuit according to claim 21, wherein said current supply is coupled to said two logic circuits by at least one relay controlled by electronic switching elements, said switching elements being connected in series and actuatable by output signals of said plurality of monitoring circuits.

23. A circuit according to claim 22, wherein said plurality of monitoring circuits switch on said current supply dependent upon battery voltage of said vehicle and switch off said current supply when said battery voltage exceeds a predetermined threshold value.

24. A circuit according to claim 23, wherein said plurality of monitoring circuits each provide a start signal to its associated one of said two logic circuits after said current supply has been switched on.

25. A circuit according to claim 24, wherein each of said monitoring circuits include a condenser charged by a stable current and discharged pursuant to said clock of an associated one of said two logic circuits, three comparators coupled to said condenser to compare the voltage of said condenser with three different threshold values, a flip flop coupled to one of said three comparators, said flip flop being reset to terminate discharging of said condenser when a lower of said three threshold values is attained, and circuit means coupled to said other of said three comparators responsive to exceeding an upper one of said three threshold values and not attaining a medium one of said three threshold values to disable said slip control apparatus.

26. A circuit according to claim 1, further including an input stage coupled between said plurality of sensors and said converter, said input stage having a plurality of synchronizable astable multivibrators each coupled to a different one of said plurality of sensors, each of said plurality of multivibrators having a self-oscillation at an inherently low frequency when said vehicle is at a standstill and the associated one of said plurality of sensors is turned on, said self-oscillation being discontinued when a malfunction occurs in said associated one of said plurality of sensors.

27. A circuit according to claim 26, further including a plurality of monitoring circuits each coupled to a different one of said two logic circutis, each of said plurality of monitoring circuits maintain a current supply coupled to said two logic circuits in the case of error-free operation and disconnects said current supply from said two logic circuits when said difference is detected by at least one of said plurality of comparators.

28. A circuit according to claim 27, wherein said current supply is coupled to said two logic circuits by at least one relay controlled by electronic switching elements, said switching elements being connected in series and actuatable by output signals of said plurality of monitoring circuits.

29. A circuit according to claim 28, wherein said plurality of monitoring circuits switch on said current supply dependent upon battery voltage of said vehicle and switch off said current supply when said battery voltage exceeds a predetermined threshold value.

30. A circuit according to claim 29, wherein said plurality of monitoring circuits each provide a start signal to its associated one of said two logic circuits after said current supply has been switched on.

31. A circuit according to claim 30, wherein each of said monitoring circuits include a condenser charged by a stable current and discharged pursuant to said clock of an associated one of said two logic circuits, three comparators coupled to said condenser to compare the voltage of said condenser with three different threshold values, a flip flop coupled to one of said three comparators, said flip flop being reset to terminate discharging of said condenser when a lower of said three threshold values is attained, and circuit means coupled to said other of said three comparators responsive to exceeding an upper one of said three threshold values and not attaining a medium one of said three threshold values to disable said slip control apparatus.

32. A circuit according to claim 1, further including a plurality of monitoring circuits each coupled to a different one of said two logic circuits, each of said plurality of monitoring circuits maintain a current supply coupled to said two logic circuits in the case of error-free operation and disconnects said current supply from said two logic circuits when said difference is detected by at least one of said plurality of comparators.

33. A circuit according to claim 32, wherein each of said monitoring circuits include a condenser charged by a stable current and discharged pursuant to said clock of an associated one of said two logic circuits, three comparators coupled to said condenser to compare the voltage of said condenser with three different threshold values, a flip flop coupled to one of said three comparators, said flip flop being reset to terminate discharging of said condenser when a lower of said three threshold values is attained, and circuit means coupled to said other of said three comparators responsive to exceeding an upper one of said three threshold values and not attaining a medium one of said three threshold values to disable said slip control apparatus.

34. A circuit according to claim 32, wherein said current supply is coupled to said two logic circuits by at least one relay controlled by electronic switching elements, said switching elements being connected in series and actuatable by output signals of said plurality of monitoring circuits.

35. A circuit according to claim 34, wherein said plurality of monitoring circuits switch on said current supply dependent upon battery voltage of said vehicle and switch off said current supply when said battery voltage exceeds a predetermined threshold value.

36. A circuit according to claim 35, wherein said plurality of monitoring circuits each provide a start signal to its associated one of said two logic circuits after said current supply has been switched on.

* * * * *